United States Patent
Nahvi

(10) Patent No.: US 12,050,544 B2
(45) Date of Patent: Jul. 30, 2024

(54) PREDICTING FREE BUFFER SPACE IN A USB EXTENSION ENVIRONMENT

(71) Applicant: Icron Technologies Corporation, Burnaby (CA)

(72) Inventor: Mohsen Nahvi, North Vancouver (CA)

(73) Assignee: Icron Technologies Corporation, Burnaby (CA)

(*) Notice: Subject to any disclaimer, the term of this patent is extended or adjusted under 35 U.S.C. 154(b) by 34 days.

(21) Appl. No.: 17/713,072

(22) Filed: Apr. 4, 2022

(65) Prior Publication Data

US 2022/0327088 A1  Oct. 13, 2022

Related U.S. Application Data

(60) Provisional application No. 63/173,832, filed on Apr. 12, 2021.

(51) Int. Cl.
  *G06F 13/42* (2006.01)
  *G06F 13/28* (2006.01)

(52) U.S. Cl.
  CPC .......... *G06F 13/4282* (2013.01); *G06F 13/28* (2013.01); *G06F 2213/0042* (2013.01)

(58) Field of Classification Search
  None
  See application file for complete search history.

(56) References Cited

U.S. PATENT DOCUMENTS

| 7,177,973 | B2 | 2/2007 | Jackson |
| 7,353,313 | B2* | 4/2008 | Wehage ................. H04L 47/10 710/305 |
| 7,761,627 | B2 | 7/2010 | Christison et al. |
| 8,825,925 | B1* | 9/2014 | Singh .................. G06F 13/12 710/36 |
| 9,736,071 | B2* | 8/2017 | Ajanovic ............ G06F 13/4252 |
| 2011/0096930 | A1* | 4/2011 | Walmsley .............. H04L 9/3247 380/278 |
| 2013/0010617 | A1* | 1/2013 | Chen .................. G01S 1/725 370/252 |

(Continued)

FOREIGN PATENT DOCUMENTS

WO  WO-2010132942 A1 * 11/2010 ............... G06F 1/08

*Primary Examiner* — Henry Tsai
*Assistant Examiner* — Christopher A Bartels
(74) *Attorney, Agent, or Firm* — Christensen O'Connor Johnson Kindness PLLC

(57) ABSTRACT

A method of managing communication between a host device and a USB device via a non-USB extension medium is provided. A downstream facing port device (DFP device) receives a data request packet that includes a first buffer count from an upstream facing port device (UFP device) via the non-USB extension medium. The DFP device determines a number of data packets to request from the USB device based on a free buffer count tracked by the DFP device that represents an amount of buffer space available on the UFP device. The DFP device generates a synthetic data request packet that includes a second buffer count based on the determined number of data packets to request from the USB device. The DFP device receives a set of data packets from the USB device responsive to the synthetic data request packet, and transmits the set of data packets to the UFP device.

20 Claims, 9 Drawing Sheets

(56) References Cited

U.S. PATENT DOCUMENTS

| | | | | |
|---|---|---|---|---|
| 2013/0282807 A1* | 10/2013 | Rudy | ............. | G06F 13/385 |
| | | | | 709/204 |
| 2015/0178241 A1* | 6/2015 | Ajanovic | ............. | G06F 13/124 |
| | | | | 710/29 |
| 2019/0087359 A1* | 3/2019 | Litichever | ............. | G06F 13/4282 |
| 2019/0235890 A1* | 8/2019 | Schnoor | ............. | G06F 13/4068 |
| 2020/0320023 A1* | 10/2020 | Litichever | ............. | G06F 21/56 |
| 2022/0092017 A1 | 3/2022 | Nahvi | | |

* cited by examiner

PREDICTING FREE BUFFER SPACE IN A USB EXTENSION ENVIRONMENT

CROSS REFERENCE TO RELATED APPLICATION

This application claims the benefit of Provisional Application No. 63/173,832, filed Apr. 12, 2021, the entire disclosure of which is hereby incorporated by reference herein for all purposes.

BACKGROUND

USB is a peripheral interface for attaching a wide variety of computing devices, such as personal computers, digital telephone lines, monitors, modems, mice, printers, scanners, game controllers, keyboards, storage devices, and/or the like. The specifications defining USB (e.g., Intel et al., Universal Serial Bus Specification, Revision 2.0, April 2000; updated as Revision 3.0 in November 2008; released as Universal Serial Bus 3.1 Specification Revision 1.0 in July 2013; released as Universal Serial Bus 3.2 Specification Revision 1.0 on Sep. 22, 2017, and subsequent updates and modifications that are backward compatible therewith, including but not limited to the Universal Serial Bus 4.0 Specification—hereinafter collectively referred to as the "USB Specifications", which term can include future modifications and revisions) are non-proprietary and are managed by an open industry organization known as the USB Forum. The USB Specifications establish basic criteria that must be met in order to comply with USB standards. One of ordinary skill in the art will recognize many terms herein from the USB Specifications. Those terms are used herein in a similar manner to their use in the USB Specifications, unless otherwise stated.

Under Revision 3.2 of the USB Specifications, Super-Speed connections are provided that use a 5 Gbps (Gen 1) or 10 Gbps (Gen 2) signaling rate. Though the specification does not mandate any particular maximum cable length, in practical terms the timing mandates and signaling techniques require a regular copper cable used for a SuperSpeed connection between a host and a device to be at most 3 meters long to properly support the SuperSpeed connection. Therefore, new techniques are needed to optionally allow for extension of a SuperSpeed USB device to a greater distance from the host to which it is coupled, such that SuperSpeed USB packets may be propagated between the host and the USB device.

BRIEF SUMMARY

In some embodiments, a method of managing communication between a host device and a USB device via a non-USB extension medium is provided. A downstream facing port device (DFP device) receives a data request packet from an upstream facing port device (UFP device) via the non-USB extension medium. The DFP device determines a number of data packets to request from the USB device. The number of data packets to request is based on a free buffer count tracked by the DFP device to represent an amount of buffer space available on the UFP device. The DFP device generates a synthetic data request packet. The synthetic data request packet includes a buffer count based on the determined number of data packets to request from the USB device. The DFP device receives a set of data packets from the USB device responsive to the synthetic data request packet. The DFP device transmits the set of data packets to the UFP device via the non-USB extension medium.

In some embodiments, a downstream facing port device (DFP device) is provided. The DFP device includes a USB physical layer interface configured to be communicatively coupled to a USB device, a remote interface configured to be communicatively coupled to a non-USB extension medium, and a memory storing a free buffer count. The downstream facing port device also includes logic that, in response to execution by the DFP device, causes the DFP device to perform actions comprising receiving a data request packet from an upstream facing port device (UFP device) via the remote interface; determining a number of data packets to request from the USB device, where the number of data packets to request is based on the free buffer count, and where the free buffer count is tracked by the DFP device to represent an amount of buffer space available on the UFP device; generating a synthetic data request packet, where the synthetic data request packet includes a buffer count, and where the buffer count is based on the determined number of data packets to request from the USB device; receiving a set of data packets from the USB device via the USB physical layer interface responsive to the synthetic data request packet; and transmitting the set of data packets to the UFP device via the remote interface.

In some embodiments, a non-transitory computer-readable medium having computer-executable instructions stored thereon is provided. The instructions, in response to execution by a downstream facing port device (DFP device), cause the DFP device to perform actions for managing communication between a host device and a USB device via a non-USB extension medium. The actions include receiving, by the DFP device, a data request packet from an upstream facing port device (UFP device) via the non-USB extension medium; determining, by the DFP device, a number of data packets to request from the USB device, where the number of data packets to request is based on a free buffer count, and where the free buffer count is tracked by the DFP device to represent an amount of buffer space available on the UFP device; generating, by the DFP device, a synthetic data request packet, where the synthetic data request packet includes a buffer count, and where the buffer count is based on the determined number of data packets to request from the USB device; receiving, by the DFP device, a set of data packets from the USB device responsive to the synthetic data request packet; and transmitting, by the DFP device, the set of data packets to the UFP device via the non-USB extension medium.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
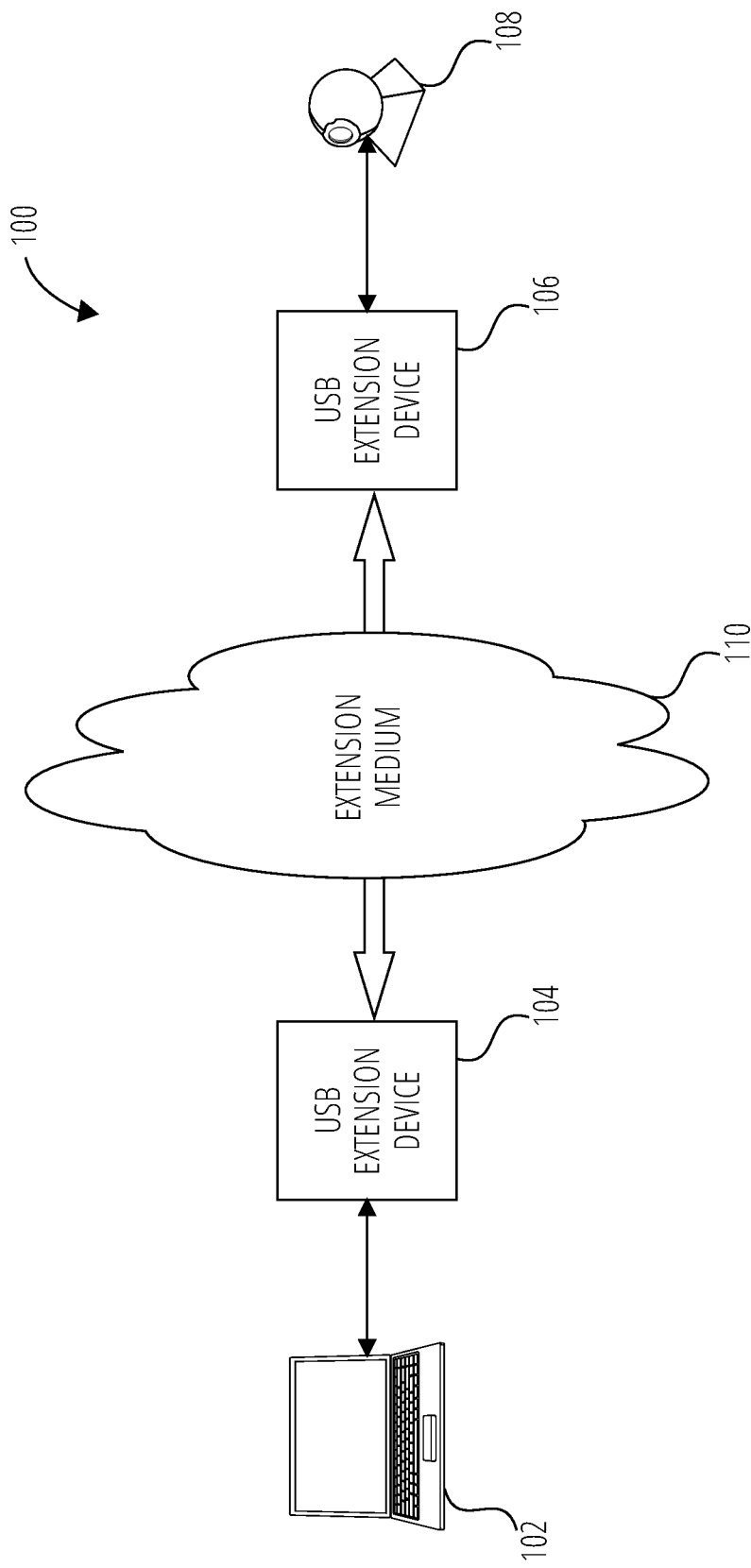
FIG. 1 is a block diagram that illustrates a non-limiting example embodiment of a system for extending USB communication according to various aspects of the present disclosure.

FIG. 1 is a block diagram that illustrates a non-limiting example embodiment of a system 100 for extending USB communication according to various aspects of the present disclosure. The system 100 includes a host device 102 and a USB device 108. Traditionally, the host device 102 and the USB device 108 would be directly connected via a USB cable, and would communicate directly with one another via a protocol that conforms to a USB specification, such as USB 1.0, USB 1.1, USB 2.0, USB 3.0, or USB 3.1. As discussed above, such a connection would be limited to a short distance between the host device 102 and the USB device 108 due to the timing requirements of the USB specification.

The host device 102 may be any type of computing device containing a USB host controller. Some examples of suitable host devices 102 may include, but are not limited to, a desktop computer, a laptop computer, a tablet computing device, a server computer, a set-top box, an audio head unit for an automobile, an embedded host, and/or the like. Likewise, the USB device 108 may be any type of device capable of communicating via a USB protocol with a USB host controller. The example illustrated in FIG. 1 is a webcam, but some other examples of suitable USB devices 108 may include, but are not limited to, a human interface device such as a keyboard or mouse, a mass storage device such as a flash drive or external hard drive, a USB-capable medical device, a printer, a USB hub, a wireless controller, and/or the like.

In the present system 100, the host device 102 is connected via a USB protocol to an upstream USB extension device 104 (also known as an upstream facing port device or UFP device) and the USB device 108 is connected via a USB protocol to a downstream USB extension device 106 (also known as a downstream facing port device or DFP device). The UFP device 104 and the DFP device 106 are communicatively coupled via an extension medium 110 such as a network that may increase the distance between the host device 102 and the USB device 108 beyond that supported by the USB specification. The extension medium 110 and communication thereon may include any suitable networking technology, such as Ethernet, Bluetooth, WiFi, WiMax, the Internet, fiber optic point-to-point transmission, and/or the like, and any suitable communication medium, such as via physical cables, via fiber optic cable, via wireless spectrum, and/or the like.

In some embodiments, the UFP device 104 and the DFP device 106 may happen to be closer to each other than the short USB requirement distance, and/or may be directly connected by a cable instead of via a network, but retain the capability of overcoming increased latency between the host device 102 and the USB device 108 that is introduced by the use of an extension medium 110 that does not comply with the USB specifications.

One feature provided by the UFP device 104 and DFP device 106 is that they hide the presence of the extension medium 110 from the host device 102 and the USB device 108. In other words, UFP device 104 and DFP device 106 handle communication over the extension medium 110 and compensate for any additional latency introduced thereby, but the host device 102 and the USB device 108 behave as if they were connected directly via a USB specification-compliant connection. Accordingly, the host device 102 and the USB device 108 can communicate via the UFP device 104 and DFP device 106 without any non-standard software or hardware re-configuration on the host device 102 or USB device 108.

Figure 2:
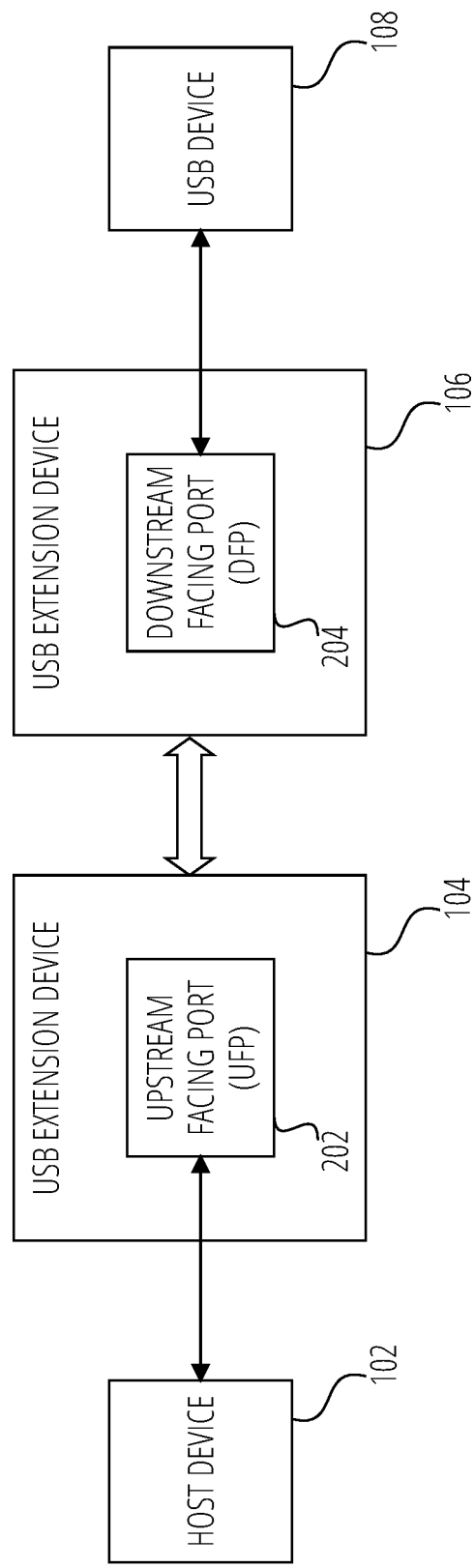
FIG. 2 is a block diagram that illustrates further details of the upstream USB extension device and downstream USB extension device illustrated in FIG. 1.

FIG. 2 is a block diagram that illustrates further details of the UFP device 104 and DFP device 106 illustrated in FIG. 1. The UFP device 104 includes an upstream facing port 202, and the DFP device 106 includes a downstream facing port 204. As used herein, the terms "upstream facing port" and the corresponding acronym "UFP" may be used interchangeably, as may the terms "downstream facing port" and the corresponding acronym "DFP." Likewise, because the upstream USB extension device 104 includes an upstream facing port 202, the upstream USB extension device 104 may also be called a "UFP device," and because the downstream USB extension device 106 includes a downstream facing port 204, the downstream USB extension device 106 may also be called a "DFP device."

The UFP device 104 is configured at least to communicate with the host device 102 via a USB-standard-compliant protocol using the upstream facing port 202, and to exchange messages and USB bus traffic with the DFP device 106 via the extension medium 110. The DFP device 106 is configured at least to communicate with the USB device 108 via a USB-standard-compliant protocol using the downstream facing port 204, and to exchange messages and USB bus traffic with the UFP device 104 via the extension medium 110. The UFP device 104 and the DFP device 106 may contain further components such as a power supply, a status LED, a loudspeaker, an input device for switching between UFP functionality and DFP functionality, and/or the like. Since such components and their functions are familiar to those of ordinary skill in the art, they have not been discussed further herein.

As illustrated in FIG. 2, the upstream facing port 202 of the UFP device 104 is connected to a downstream facing port of the host device 102, and the downstream facing port 204 of the DFP device 106 is connected to an upstream facing port of a USB device 108. In other embodiments, the upstream facing port 202 of the UFP device 104 may be connected to a downstream facing port other than one provided by a host device 102, such as a downstream facing port of a hub, and/or the like. Likewise, in other embodiments, the downstream facing port 204 of the DFP device 106 may be connected to an upstream facing port other than one provided by a USB device 108, such as an upstream facing port of a hub, and/or the like. The discussion below is primarily in terms of the simple topology illustrated in FIG. 2, but one of ordinary skill in the art will recognize that in some embodiments similar techniques may be used in other topologies without departing from the scope of the present disclosure.

Figure 3:
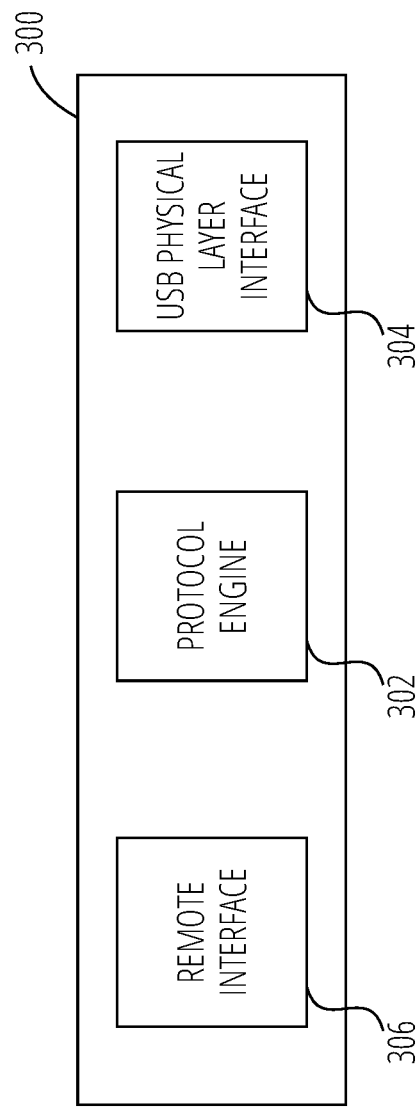
FIG. 3 is a block diagram that illustrates a non-limiting example embodiment of a port device according to various aspects of the present disclosure.

FIG. 3 is a block diagram that illustrates an exemplary embodiment of a port device 300 according to various aspects of the present disclosure. In some embodiments, the port device 300 may be constructed to provide services of an upstream facing port 202, and in some embodiments the port device 300 may be constructed to provide services of a downstream facing port 204. In some embodiments, the port device 300 may include instructions to provide services of both an upstream facing port 202 and a downstream facing port 204, wherein the particular port services that are provided are determined by a user configuration such as a jumper switch, a firmware setting, and/or the like.

As illustrated, the port device 300 includes a protocol engine 302, a USB physical layer interface 304, and a remote interface 306. In some embodiments, the protocol engine 302 may be configured to provide and/or execute the logic discussed below with regard to the UFP device 104 and/or the DFP device 106. The protocol engine 302 may instruct the USB physical layer interface 304 to apply the appropriate electrical signals to the USB physical layer in order to communicate with the USB device 108 or the host device 102. Likewise, the protocol engine 302 may instruct the remote interface 306 to exchange information with the remote USB extension device.

In some embodiments, the protocol engine 302 may be implemented within a logic device such as a PLD, an ASIC, a FPGA, and/or the like. In other embodiments, the protocol engine 302 may be implemented within a computing device having at least one processor and a memory containing computer-executable instructions that, if executed by the at least one processor, cause the protocol engine 302 to perform the actions discussed below; a dedicated digital hardware device implemented, for example, as a state machine configured to perform the actions described; within an application specific processor; and/or within any other suitable computing device. In some embodiments, the protocol engine 302 (or other component of the port device 300) may include a computer-readable memory usable to cache data packets, as discussed further below.

In some embodiments, logic of actions attributed to a USB extension device is executed by a protocol engine 302, which then instructs a USB physical layer interface 304 and/or a remote interface 306 to perform the appropriate communication steps associated with the logic. Throughout the discussion below, such actions may simply be described as being performed by the UFP device 104 or the DFP device 106 as if it was a single device for ease of discussion. One of ordinary skill in the art will recognize that actions attributed directly to the UFP device 104 or the DFP device 106 may actually be performed by a protocol engine 302, a USB physical layer interface 304, a remote interface 306, and/or some other component of the USB extension device.

One common problem in supporting communication over an extension medium is dealing with latency between the UFP device 104 and the DFP device 106. For example, for isochronous IN transactions, the latency between the UFP device 104 and DFP device 106 means that the host device 102 may not receive all of its expected DATA packets before the end of a service interval as required by the USB Specification due to the latency. One strategy for overcoming this latency issue is for the UFP device 104 to cause the host device 102 to wait while the UFP device 104 caches DATA packets retrieved from the USB device 108 by the DFP device 106, and then to deliver the DATA packets to the host device 102 in response to a request in a subsequent service interval.

Figure 4:
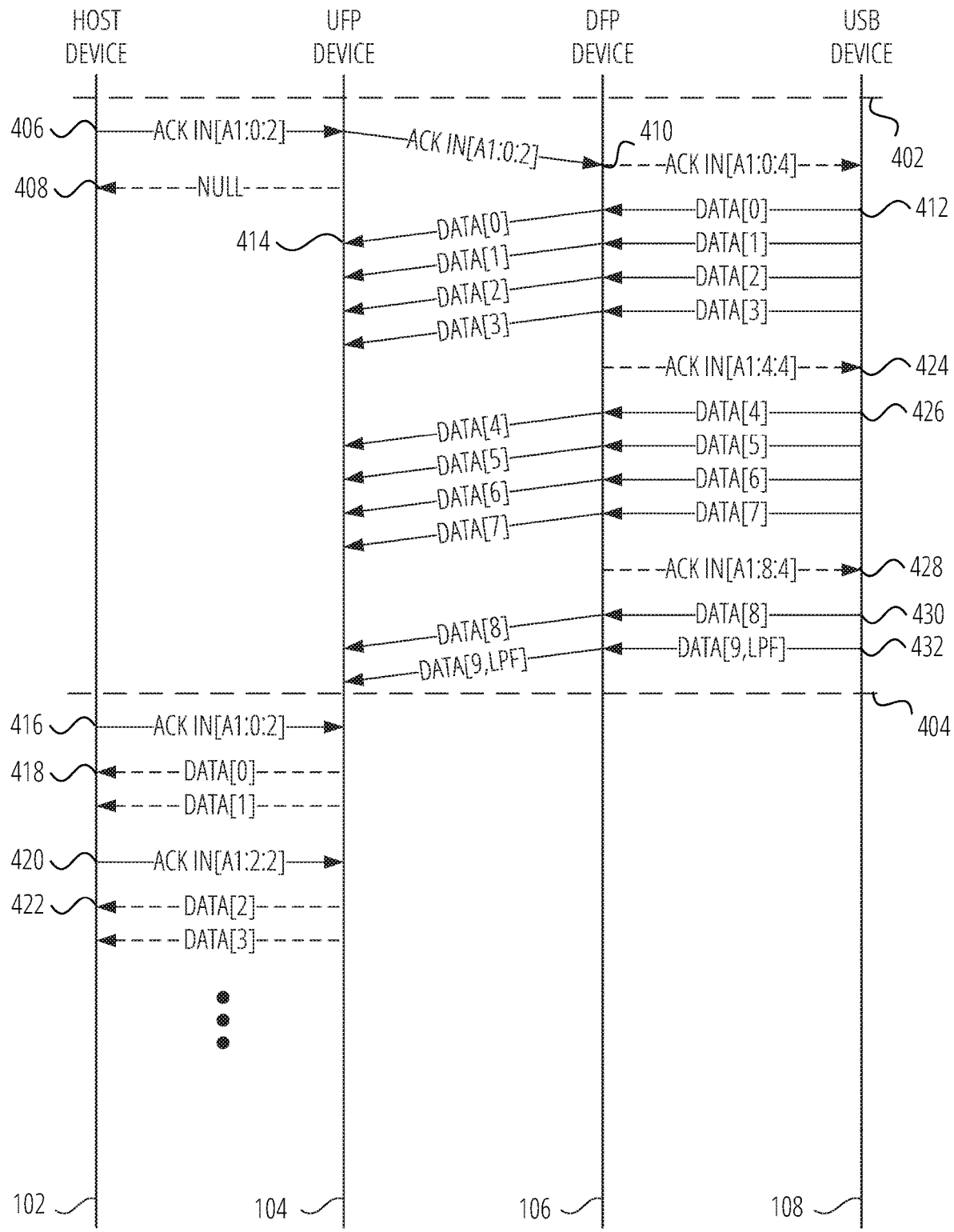
FIG. 4 is a sequence diagram that illustrates a non-limiting example embodiment of a technique for compensating for latency in communication between a host device and a USB device over an extension medium according to various aspects of the present disclosure.

FIG. 4 is a sequence diagram that illustrates a non-limiting example embodiment of a technique for compensating for latency in communication between a host device 102 and a USB device 108 over an extension medium 110 according to various aspects of the present disclosure. This technique is similar to techniques described in commonly owned U.S. Pat. No. 10,552,355, the entire disclosure of which is hereby incorporated by reference for all purposes.

In the sequence diagram illustrated in FIG. 4 (and in the other sequence diagrams included herewith), time advances from the top of the diagram to the bottom of the diagram. Solid arrows indicate the transmission of packets generated by a host device 102 or USB device 108 according to the USB Specifications (and/or encapsulated or translated versions thereof). Dashed arrows indicate the transmission of synthetic packets generated by a UFP device 104 or a DFP device 106, either based on a packet generated by a host device 102 or USB device 108, or in response to a packet generated by a host device 102 or a USB device 108. The synthetic packets may be identical in content to the packets generated by a host device 102 or a USB device 108 but shifted in time, or may have content that is altered from the content of the packets generated by a host device 102 or a USB device 108. Horizontal arrows between separate elements indicate transmissions that comply with timing requirements of the USB Specifications, while angled arrows indicate transmissions over the extension medium 110 that may be affected by increased latency.

In SuperSpeed communication, the host device 102 schedules service intervals of, for example, 125 μs. In FIG. 4, a first service interval boundary 402 is indicated by a first horizontal line, and a second service interval boundary 404 is indicated by a second horizontal line. The first horizontal line and the second horizontal line may indicate the generation and transmission of an isochronous timestamp packet (ITP), though multiple ITPs may be generated and transmitted between the first service interval boundary 402 and the second service interval boundary 404. The first service interval boundary 402 and second service interval boundary 404 are illustrated as spanning the host device 102, UFP device 104, DFP device 106, and USB device 108 at the same time to indicate the logical separation between service intervals. In some embodiments, the generation of service intervals by the host device 102 and the generation of corresponding synthetic service intervals by the DFP device 106 may not happen simultaneously.

As described in Section 8.12.5 of the USB Specification, the host device 102 is required to schedule transactions, including isochronous transactions, such that they do not cross these service interval boundaries. As such, it is important for compliance with the USB Specification that the transactions between the host device 102 and the UFP device 104, and transactions between the DFP device 106 and the USB device 108, do not cross the respective service interval boundaries. However, the host device 102 schedules transactions without knowing about the added latency introduced between the UFP device 104 and the DFP device 106 by the extension medium 110. As shown, the UFP device 104 and DFP device 106 obtain extra data packets from the USB device 108 and cache them at the UFP device 104 in order to be able to satisfy requests from the host device 102 without having to consider the latency between the UFP device 104 and the DFP device 106.

At point 406, the host device 102 sends a data request packet to the UFP device 104 that includes a sequence number ("0") and a number of packets ("2"). The number of packets is a number of packets expected by the host device 102, and is also referred to as a "buffer count". The UFP device 104 transmits the data request packet to the DFP device 106. At point 408, the UFP device 104 transmits a synthetic null packet back to the host device 102 to place the host device 102 in a temporary waiting state. The illustrated synthetic null packet may be a data packet with a zero-length payload, but any other type of packet that can place the host device 102 in a waiting state may be used. In response to receiving the synthetic null packet, the host device 102 enters a waiting state in which it does not re-transmit the data request packet until after the second service interval boundary 404.

At point 410, the DFP device 106 sends a synthetic data request packet to the USB device 108. The synthetic data request packet created by the DFP device 106 includes the sequence number from the data request packet transmitted by the host device 102 at point 406. However, the DFP device 106 has altered the number of packets such that it does not match the number of packets in the data request packet transmitted by the host device 102 at point 406.

In some embodiments, the DFP device 106 may request a greater number of packets than were requested by the host device 102. Requesting a greater number of packets allows the DFP device 106 to receive additional data that can be sent to the UFP device 104 to respond to subsequent requests from the host device 102 without having to wait for a round-trip communication between the UFP device 104 and the DFP device 106. In some embodiments, the DFP device 106 may determine a number of packets associated with a maximum burst size value that has been configured by the host device 102 for the USB topology or for the particular USB device 108 during the initial enumeration conducted by the host device 102. The DFP device 106 may request a number of packets to correspond to the maximum burst size, regardless of whether the host device 102 requested fewer packets in its first request. This may ensure that the UFP device 104 will have all of the data that the host device 102 would request during a single service interval. A maximum number of packets that may be processed by a host device 102 during a service interval may be up to 48 for 5 Gbps communication or 96 for 10 Gbps communication. USB devices 108 are normally configured with maximum burst size values lower than these limits. A typical maximum burst size may be around 6 or 7, though values as low as 3 may be possible, as well as values as high as 12 for devices including but not limited to some high-definition cameras, or even higher for other devices.

In other embodiments, the DFP device 106 may request any number of packets that is between the number of packets requested by the host device 102 and the maximum burst size. As illustrated, the DFP device 106 has generated a synthetic packet to request four packets, instead of the two originally requested by the host device 102. This may be because the maximum burst size has been configured to be four, or for other reasons including but not limited to a configuration on the DFP device 106, a determination based on the number of packets from the original request packet, or a determination based on the amount of latency between the UFP device 104 and the DFP device 106.

At point 412, the USB device 108 transmits the requested data packets to the DFP device 106. The DFP device 106 then transmits the requested data packets to the UFP device 104, which begins to receive them at point 414.

At point 416, the host device 102 determines that the second service interval boundary 404 has occurred, and so the host device 102 transmits a new request packet that may be similar to the request packet transmitted at point 406. At point 418, the UFP device 104 responds with the first two data packets that had been cached on the UFP device 104. These data packets are illustrated with dashed lines and may be considered synthetic data packets because they are shifted in time by virtue of being cached by the UFP device 104.

At point 420, the host device 102 may then transmit another request packet to request the next two data packets, and at point 422 the UFP device 104 may respond with the next two data packets that had also been cached on the UFP device 104. One will note that, by pre-fetching more data than requested by the host device 102, the UFP device 104 is able to provide a maximum amount of data that can be transferred during a single service interval, even if a high amount of latency exists between the UFP device 104 and the DFP device 106.

FIG. 4 also illustrates that the DFP device 106 may retrieve as many data packets as possible from the USB device 108 during a given service interval. The data packets transmitted at point 412 from the USB device 108 to the DFP device 106 included all of the data packets requested, but did not include a data packet with a last packet flag (LPF) set. According to the USB Specifications, this indicates to the DFP device 106 that the USB device 108 has additional data packets to transmit. Accordingly, at point 424, the DFP device 106 transmits an additional synthetic data request packet to request a subsequent set of data packets from the USB device 108, and at point 426 the USB device 108 responds with data packets responsive to the request. At point 428, the DFP device 106 transmits another synthetic data request packet, and at point 430, the USB device 108 begins to transmit a responsive set of data packets. At point 432, the USB device 108 transmits the last data packet of the burst. The USB device 108 indicates that the data packet transmitted at point 432 is the last data packet by setting a last packet flag (LPF) in the last data packet. By detecting these types of data packet, the DFP device 106 understands that the USB device 108 has transmitted all of its data, and therefore does not transmit an additional synthetic data request packet before the second service interval boundary 404 to request further data packets until a new request packet is received from the UFP device 104.

One will note that the transmission of requests by the host device 102 for two packets is an example only, and that in some embodiments, different numbers of packets may be requested. For example, Section 8.12.6.2 of the USB 3.1 Specification indicates that a host device 102 may split a transfer into bursts of 2, 4, or 8 data packets, followed by a burst of however many packets are remaining to be requested. Accordingly, in some embodiments, to request six data packets during a service interval the host device 102 may request four data packets at point 418, and then two data packets at point 420. In practice, it has been found that host devices 102 exhibit a variety of behavior.

Figure 5:
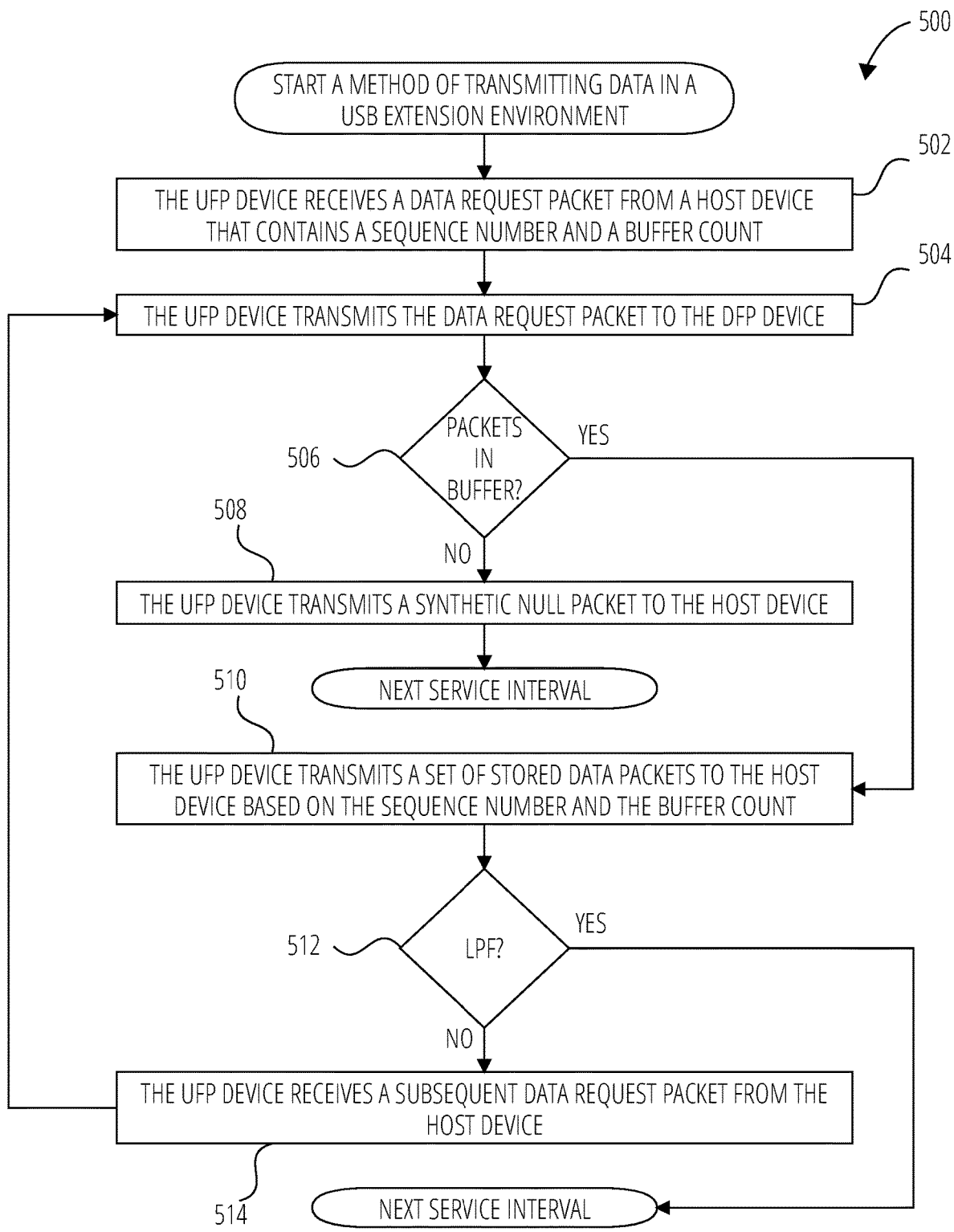
FIG. 5 is a flowchart that illustrates a non-limiting example embodiment of a method of transmitting data in a USB extension environment according to various aspects of the present disclosure.

FIG. 5 is a flowchart that illustrates a non-limiting example embodiment of a method of transmitting data in a USB extension environment according to various aspects of the present disclosure. The method 500 illustrated in FIG. 5 is another way of depicting the actions taken by the UFP device 104 during the communication illustrated in the sequence diagram of FIG. 4. As such, the description below of FIG. 5 includes references to the corresponding points of FIG. 4.

From a start block, the method 500 proceeds to block 502, where the UFP device 104 receives a data request packet from a host device 102 that contains a sequence number and a buffer count (see point 406). At block 504, the UFP device 104 transmits the data request packet to the DFP device 106 (see point 410).

At decision block 506, a determination is made regarding whether the UFP device 104 contains any data packets in its buffer responsive to the data request packet received from the host device 102. If the UFP device 104 does not yet have any data packets in its buffer responsive to the data request packet received from the host device 102, the result of decision block 506 is NO, and the method 500 proceeds to block 508. At block 508, the UFP device 104 transmits a synthetic null packet to the host device 102 (see point 408). The method 500 then advances to an end block and waits until a subsequent service interval to be repeated.

Otherwise, if the UFP device 104 does have data packets in its buffer that are responsive to the data request packet received from the host device 102, then the result of decision block 506 is YES, and the method 500 proceeds to block 510. At block 510, the UFP device 104 transmits a set of stored data packets to the host device 102 based on the sequence number and the buffer count (see point 418).

At decision block 512, a determination is made regarding whether the set of stored data packets transmitted to the host device 102 included a data packet having the LPF flag set. If the set of stored data packets did not include a data packet having the LPF flag set, then the result of decision block 512 is NO, and the method 500 proceeds to block 514. At block 514, the UFP device 104 receives a subsequent data request packet from the host device 102, and returns to block 504 to process the subsequent data request packet.

Returning to decision block 512, if a data packet having the LPF flag set is included in the set of stored data packets transmitted to the host device 102, then the result of decision block 512 is YES, and the method 500 advances to an end block and waits until a subsequent service interval to be repeated.

While the overall technique illustrated in FIG. 4 and FIG. 5 is effective in overcoming the latency between the UFP device 104 and the DFP device 106, additional issues arise when implementing this functionality. For example, by requesting much larger numbers of data packets from the USB device 108 than are actually requested by the host device 102, the host device 102 may empty the cached data packets from the buffer on the UFP device 104 more slowly than the cached data packets are provided by the DFP device 106. As another example, because the data requests from the host device 102 are essentially delayed by at least one service interval, the buffer on the UFP device 104 may store data packets from multiple service intervals at a time. Depending on the size of the buffer on the UFP device 104, it may be possible for the buffer on the UFP device 104 to become full and unable to handle additional data packets from the DFP device 106.

Because the DFP device 106 is the device determining how many data packets to request from the USB device 108 during a given service interval (and not the UFP device 104), it is desirable for the DFP device 106 to track how much space is available in the buffer of the UFP device 104 to avoid requesting data packets from the USB device 108 for which there will not be room on the UFP device 104.

Figure 6:
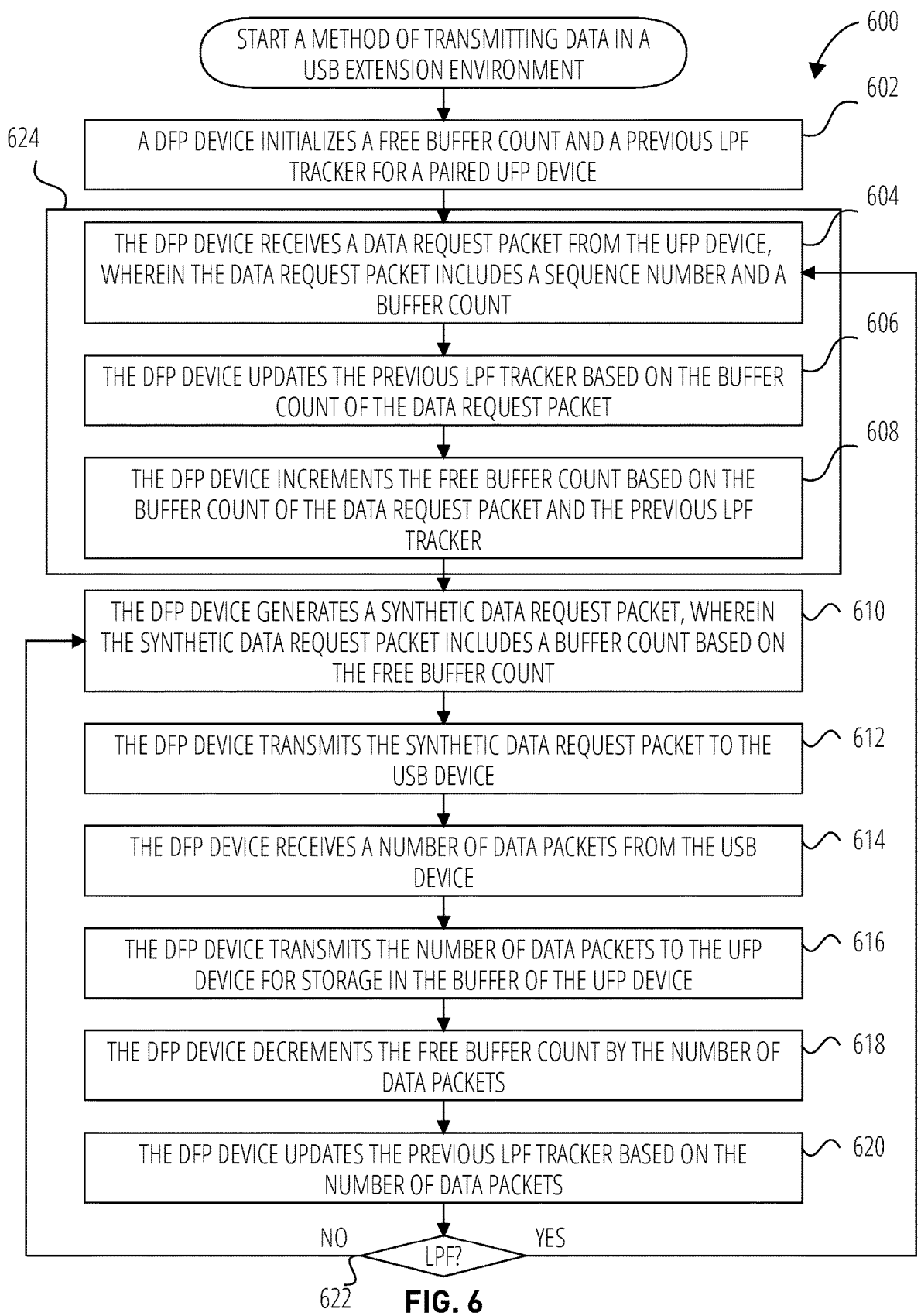
FIG. 6 is a flowchart that illustrates a non-limiting example embodiment of a method of transmitting data in a USB extension environment according to various aspects of the present disclosure.

FIG. 6 is a flowchart that illustrates a non-limiting example embodiment of a method of transmitting data in a USB extension environment according to various aspects of the present disclosure. In the method 600, the DFP device 106 tracks a free buffer count based on a count of data packets that the DFP device 106 has sent to the UFP device 104 and data request packets received by the DFP device 106 from the UFP device 104. The free buffer count represents the amount of buffer space available at the UFP device 104 for data packets. By tracking the free buffer count, the DFP device 106 can avoid requesting and transmitting more data packets than can be stored by the UFP device 104, and does not require additional reporting of the amount of buffer space available to the DFP device 106. The method 600 assumes that the UFP device 104 is performing a counterpart upstream method, such as the method 500 illustrated in FIG. 5.

From a start block, the method 600 proceeds to block 602, where a DFP device 106 initializes a free buffer count and a previous LPF tracker for a paired UFP device 104. In some embodiments, the DFP device 106 and UFP device 104 may receive commands to pair with each other. In some embodiments wherein the extension medium 110 includes an addressable network technology such as Ethernet or TCP/IP, the DFP device 106 and UFP device 104 may be provided with a network address of the corresponding device to be paired with. In some embodiments wherein the extension medium 110 includes a direct connection between the DFP device 106 and UFP device 104 (such as a fiber optic cable), the pairing commands may be implicit in the connection, or may be transmitted upon detecting the physical connection between the devices. In some embodiments, the UFP device 104 may transmit a size of its data packet buffer to the DFP device 106, and the DFP device 106 may initialize the free buffer count based on this information. In some embodiments, the DFP device 106 may be pre-configured or manually configured with the free buffer count of the UFP device 104.

The DFP device 106 may use any suitable technique for implementing a previous LPF tracker, which is usable by the DFP device 106 to determine how many packets were transmitted in a previous service interval before a packet with the LPF flag set was transmitted. In some embodiments, the previous LPF tracker may be implemented in a FIFO queue, wherein a single bit in each entry in the queue indicates whether a corresponding packet had its LPF flag set. As packets are transmitted by the DFP device 106, entries are added to the FIFO queue (see block 620), and as acknowledgements are received from the UFP device 104, entries are removed from the FIFO queue (see block 608). In such embodiments, the DFP device 106 may initialize the previous LPF tracker by clearing the FIFO queue. In some embodiments, the previous LPF tracker may be implemented by recording a sequence number of a packet having the LPF flag set. In such embodiments, the DFP device 106 may initialize the previous LPF tracker by setting the sequence number to zero.

From block 602, the method 600 proceeds to block 604, where the DFP device 106 receives a data request packet from the UFP device 104, wherein the data request packet includes a sequence number and a buffer count. As shown in FIG. 4 at point 410, the sequence number and buffer count of the data request packet received from the UFP device 104 may match the sequence number and buffer count of the data request packet received by the UFP device 104 from the host device 102.

At block 606, the DFP device 106 updates the previous LPF tracker based on the buffer count of the data request packet. In embodiments wherein the previous LPF tracker is implemented using a FIFO queue, the DFP device 106 may remove a number of entries from the FIFO queue based on the buffer count of the data request packet. Typically, the DFP device 106 may remove a number of entries from the FIFO queue equal to the buffer count of the data request packet. However, the DFP device 106 may stop removing entries from the FIFO queue once an entry that indicates that the corresponding packet had its LPF flag set. In this case, the DFP device 106 may remove fewer entries from the FIFO queue than the number indicated by the buffer count of the data request packet. In embodiments wherein the previous LPF tracker is implemented by recording the sequence number of the data packet having the LPF flag set, the DFP device 106 may skip updating the previous LPF tracker at block 606.

At block 608, the DFP device 106 increments the free buffer count based on the buffer count of the data request packet and the previous LPF tracker. The DFP device 106 does not increment the free buffer count any higher than the size of the buffer that was determined at block 602. Accordingly, for the first trip through block 608, the DFP device 106 may not make any changes to the free buffer count, since no data packets have yet been transmitted to the UFP device 104, and the buffer is known to be empty.

For subsequent trips through block 608, the free buffer count can be incremented upon receiving the data request packet because the receipt of the data request packet implies that the UFP device 104 will immediately be providing the number of data packets indicated in the buffer count of the data request packet to the host device 102 out of its buffer, and so that much space will be available in the buffer of the UFP device 104 by the time the request is processed by the DFP device 106 and USB device 108.

In some embodiments, the number of data packets indicated by the buffer count of the data request packet is a ceiling on the amount to increment the free buffer count, and the actual amount of the increment may be reduced based on the previous LPF tracker. For example, if the previous LPF tracker is implemented using a FIFO queue as described above, the free buffer count may only be incremented by the number of entries removed from the FIFO queue at block 606, which may be smaller than the buffer count of the data request packet if an entry indicating an LPF packet was removed from the FIFO queue. This ensures that the free buffer count is not incremented any further than a number of data packets actually delivered by the UFP device 104 to the host device 102 during a given service interval.

At block 610, the DFP device 106 generates a synthetic data request packet, wherein the synthetic data request packet includes a buffer count based on the free buffer count. For the first time through block 610 for a given service interval, since there is no previously transmitted sequence number, the DFP device 106 may include a sequence number in the synthetic data request packet that starts at sequence number zero. Otherwise, the DFP device 106 may use a sequence number that continues on from a previous transmission of the present service interval. The buffer count of the synthetic data request packet is determined similarly to the buffer count at point 410 of FIG. 4, but instead of always requesting the maximum configured number of data packets, the DFP device 106 at block 610 ensures that the buffer count of the synthetic data request packet is less than or equal to the free buffer count in order to avoid retrieving more data packets than can be stored by the UFP device 104.

At block 612, the DFP device 106 transmits the synthetic data request packet to the USB device 108, and at block 614, the DFP device 106 receives a number of data packets from the USB device 108. The number of data packets may be the requested number of data packets indicated by the buffer count of the synthetic data request packet, or may be fewer than the requested number of data packets (such as when a data packet with the LPF flag set is received before all of the requested number of data packets have been received).

At block 616, the DFP device 106 transmits the number of data packets to the UFP device 104 for storage in the buffer of the UFP device 104. At block 618, the DFP device 106 decrements the free buffer count by the number of data packets in order to accurately reflect how many data packets were transmitted, and at block 620, the DFP device 106 updates the previous LPF tracker based on the number of data packets. In embodiments wherein the previous LPF tracker is implemented in a FIFO queue, the DFP device 106 may add entries to the FIFO queue for each data packet of the number of data packets. If one of the data packets had the LPF flag set, the entry in the FIFO queue would indicate that the LPF flag was set. In embodiments wherein the sequence number of the data packet having the LPF flag set is tracked for the previous LPF tracker, the sequence number of such a packet, if any, may be recorded.

The method 600 then advances to a decision block 622, where a determination is made based on whether the number of data packets included a data packet having the LPF flag set to indicate that the USB device 108 is finished providing data packets for the present service interval. If so, then the result of decision block 622 is YES, and the method 600 returns to block 604 to await a subsequent data request packet from the UFP device 104 during a subsequent service interval. Otherwise, the result of decision block 622 is NO, and the method 600 returns to block 610 to generate a subsequent synthetic data request packet.

One will note that block 604, block 606, and block 608 are illustrated as being grouped into block group 624. In some embodiments, the actions of block group 624 may occur multiple times during a given service interval (e.g., while the illustrated method 600 is iterating between blocks 610-622), as the host device 102 transmits multiple requests for data packets to the UFP device 104. Though the actions of block group 624 are illustrated in a linear flow in FIG. 6 for the sake of clarity, one of ordinary skill in the art will recognize that the actions of block group 624 may occur multiple times at any point between, before, or after blocks 610-622, inclusive.

Figure 7A:
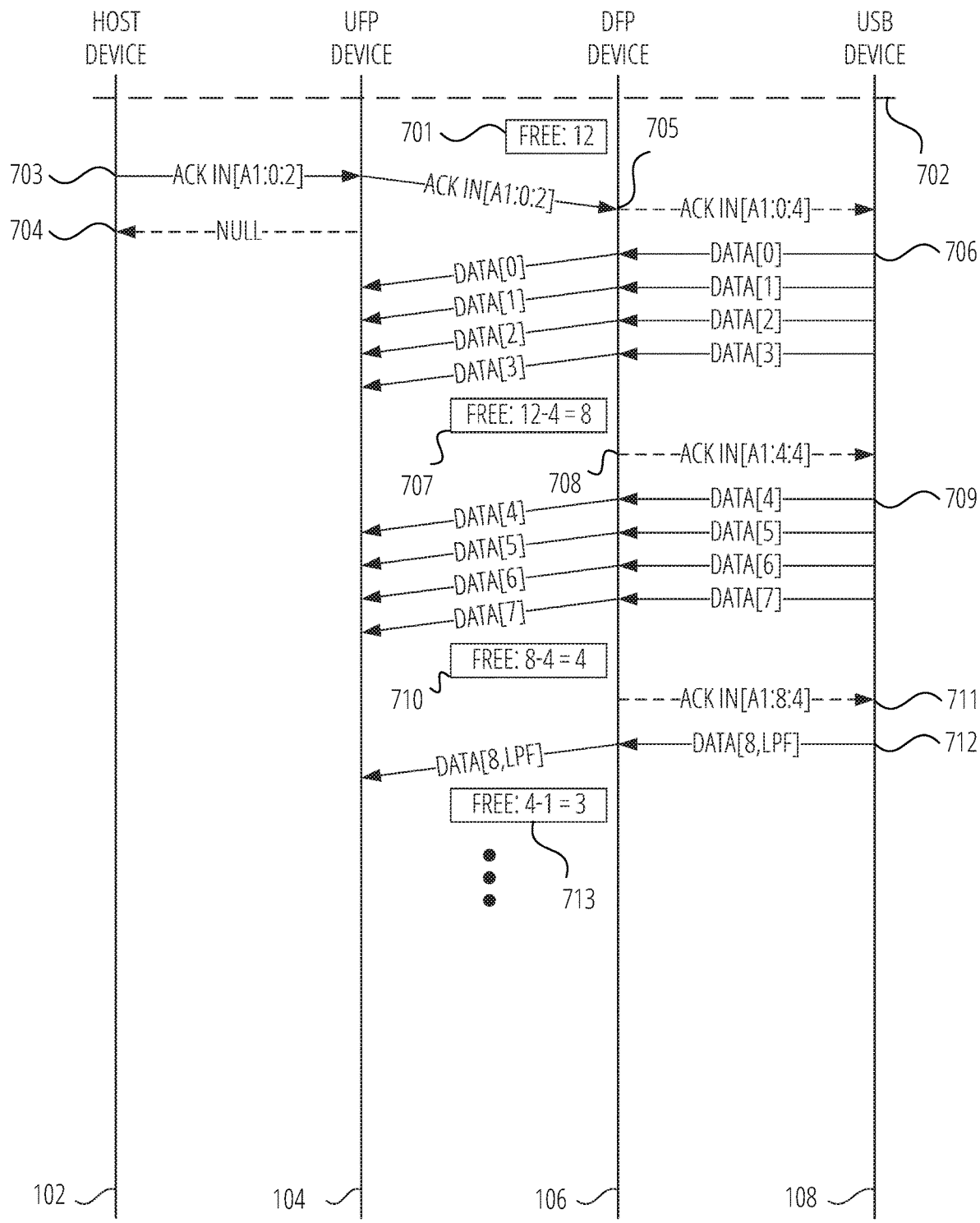
FIG. 7A-FIG. 7C are a sequence diagram that illustrates a non-limiting example embodiment of the execution of the method illustrated in FIG. 6 according to various aspects of the present disclosure.
Figure 7B:
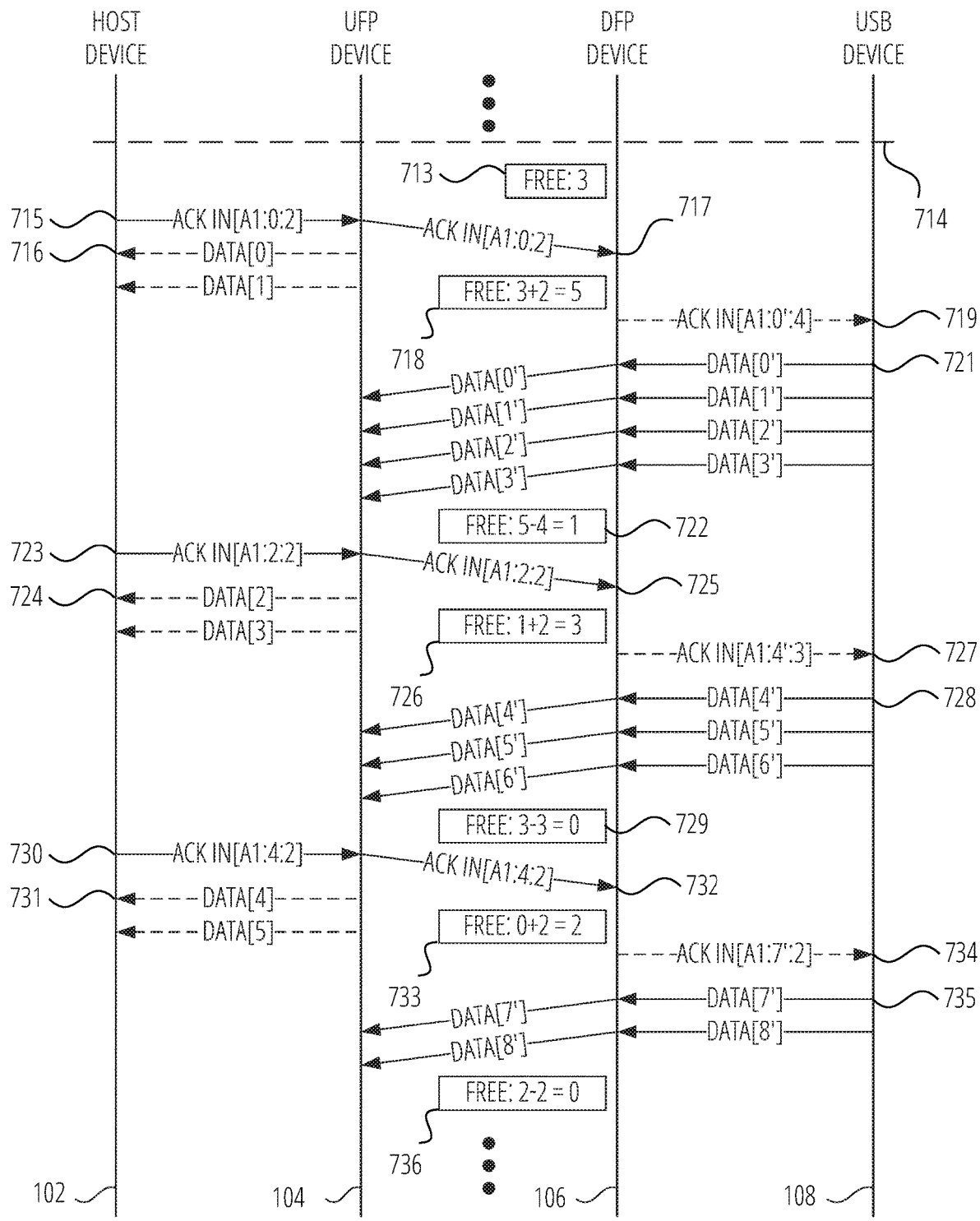
Figure 7C:
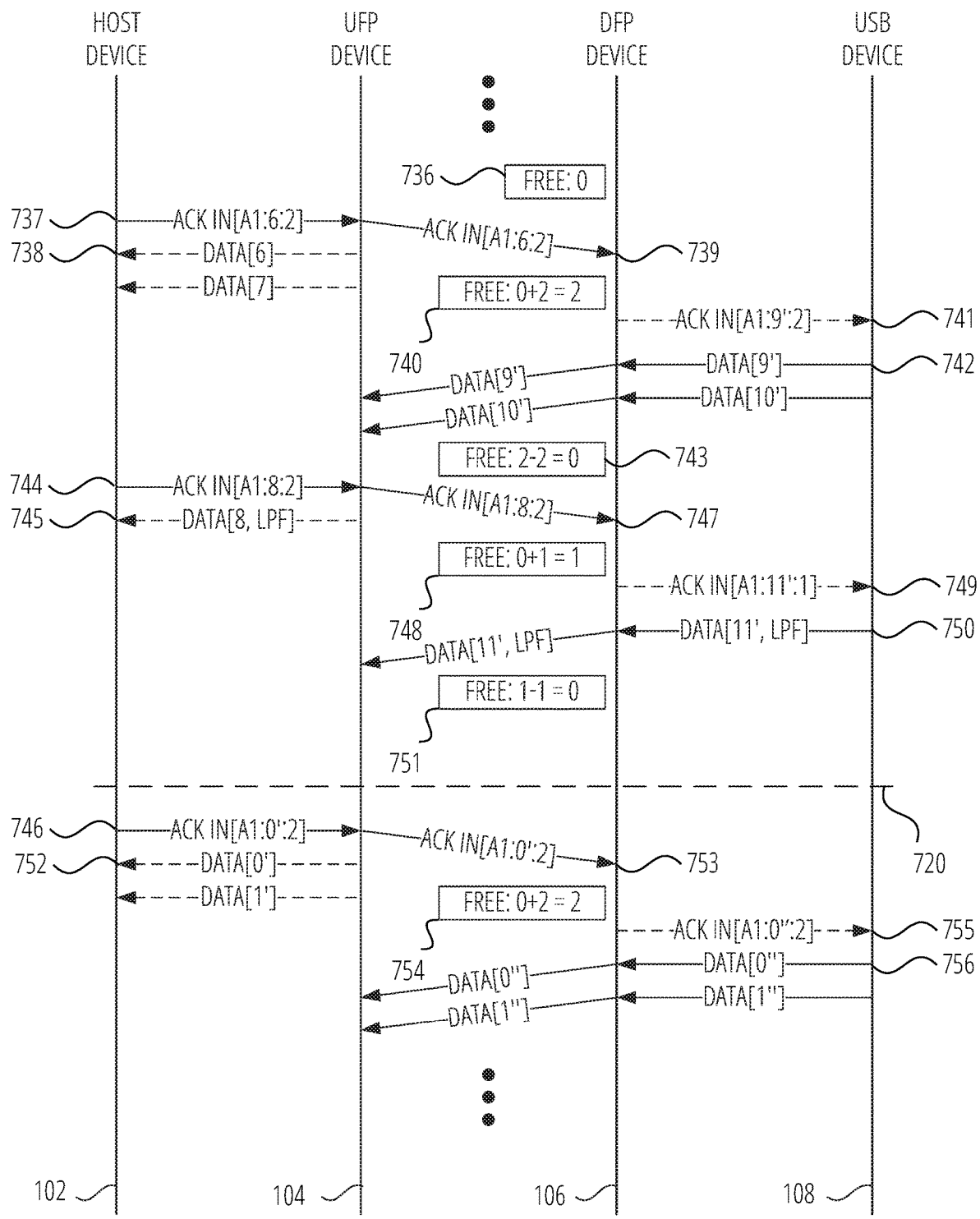

FIG. 7A-FIG. 7C are a sequence diagram that illustrates a non-limiting example embodiment of the execution of the method illustrated in FIG. 6 according to various aspects of the present disclosure. The sequence of FIG. 7A-FIG. 7C illustrates how the method 600 can solve the problem of overflowing the buffer of the UFP device 104 that could occur if the sequence of FIG. 4 was allowed to continue without checking for such overflows.

In FIG. 7A, it is assumed that the UFP device 104 and the DFP device 106 have already paired with each other, and that the UFP device 104 has informed the DFP device 106 that it has a buffer of size 12. Accordingly, the DFP device 106 has initialized its free buffer count at point 701 to be 12. After a first service interval boundary 702, the host device 102 transmits a data request packet at point 703. Because the UFP device 104 does not yet have any stored data packets responsive to the data request packet, the UFP device 104 responds with a synthetic NULL packet at point 704 (see block 508 in FIG. 5).

The DFP device 106 receives the data request packet and transmits a corresponding synthetic data request packet at point 705. The synthetic data request packet includes a buffer count based in part on the free buffer count (see block 610 in FIG. 6). For purposes of the present discussion, the DFP device 106 is configured to request up to 4 data packets with its synthetic data request packets, and since the free buffer count at point 705 is 12, there is enough room for the DFP device 106 to request all 4 data packets. This configuration is an example only, and in other embodiments, the DFP device 106 may be configured to request more or fewer than 4 data packets by default.

At point 706, the USB device 108 transmits a number of data packets responsive to the synthetic data request packet to the DFP device 106, which in turn transmits the number of data packets to the UFP device 104 for storage (see blocks 614-616 in FIG. 6). At point 707, the DFP device 106 decrements the free buffer count by the number of data packets that were transmitted to the UFP device 104 (see block 618 in FIG. 6), so the free buffer count is now 8, and the DFP device 106 updates the previous LPF tracker based on the number of data packets (see block 620 in FIG. 6).

Because the number of data packets did not include a data packet with the LPF flag set (see NO branch from decision block 622 in FIG. 6), the DFP device 106 transmits another synthetic data request packet at point 708 (see block 610 in FIG. 6). Again, the free buffer count of 8 at point 707 indicates that there is enough room for all 4 desired data packets, so the synthetic data request packet at point 708 includes a buffer count of 4. At point 709, the USB device 108 begins transmitting a number of data packets responsive to the synthetic data request packet to the DFP device 106, and the DFP device 106 transmits the number of data packets to the UFP device 104 for storage (see blocks 614-616 of FIG. 6). At point 710, the DFP device 106 again decrements the free buffer count by the number of data packets transmitted to the UFP device 104 (see block 618 of FIG. 6), and again updates the previous LPF tracker based on the number of data packets (see block 620 in FIG. 6).

Because the number of data packets again did not include a data packet with the LPF flag set (see NO branch from decision block 622 in FIG. 6), the DFP device 106 transmits another synthetic data request packet at point 711 (see block 610 in FIG. 6). Yet again, the free buffer count of 4 at point 710 indicates that there is enough room for all 4 desired data packets, so the synthetic data request packet at point 711 includes a buffer count of 4.

At point 712, the USB device 108 transmits a number of data packets responsive to the synthetic data request packet. This time, the USB device 108 transmits a single data packet which has the LPF flag set, indicating that it is the last data packet to be transmitted during the current service interval. Accordingly, the DFP device 106 transmits the single data packet to the UFP device 104, and at point 713, the DFP device 106 decrements the free buffer count only by the number of data packets transmitted to the UFP device 104 (one), not by the larger number of data packets requested from the USB device 108 in the synthetic data request packet (see block 618 in FIG. 6). The DFP device 106 updates the previous LPF tracker based on the number of data packets, e.g., by adding an entry to a FIFO queue that indicates presence of the LPF flag, by storing the sequence number of the data packet transmitted at point 712, or using any other suitable technique.

Since a data packet with the LPF flag set was received, the DFP device 106 waits to receive a subsequent data request packet from the UFP device 104 (see YES branch from decision block 622 in FIG. 6) during a subsequent service interval.

One will recognize that once the UFP device 104 receives the data packet generated by the USB device 108 at point 712, the UFP device 104 stores nine data packets (from sequence number 0 to sequence number 8). This is reflected by the free buffer count at point 713 of 3—since the size of the buffer is 12 and there are nine data packets stored in the buffer, there is room for 3 data packets remaining.

The sequence continues from the bottom of FIG. 7A to the top of FIG. 7B, where a second service interval boundary 714 occurs. Carried over from FIG. 7A, the free buffer count at the start of this service interval is 3 as indicated at point 713.

At point 715, the host device 102 transmits a data request packet to the UFP device 104, and the UFP device 104 retransmits the data request packet to the DFP device 106. Since the host device 102 now stores data packets that are responsive to the data request packet, the UFP device 104 transmits the requested number of data packets from its buffer to the host device 102 at point 716 (see block 510 in FIG. 5).

At point 717, the DFP device 106 receives the data request packet. Using the buffer count in the data request packet and noting that the previous LPF tracker does not indicate that the UFP device 104 would have transmitted a packet with the LPF flag set in response to the data request packet, the DFP device 106 increments the free buffer count at point 718 under the assumption that the requested data packets will have been provided by the UFP device 104 to the host device 102 and corresponding space cleared in the buffer of the UFP device 104 by the time further data packets are transmitted to the UFP device 104 by the DFP device 106 (see blocks 604-608 in FIG. 6). Accordingly, at point 718, the free buffer count is 5, and the previous LPF tracker has been updated (e.g., if the previous LPF tracker is implemented with a FIFO queue, entries corresponding to the buffer count of the data request packet have been removed from the FIFO queue).

At point 719, the DFP device 106 generates and transmits a synthetic data request packet (see blocks 610-612 of FIG. 6). The DFP device 106 starts the sequence number for the synthetic data request packet at 0' because it is the first synthetic data request packet of the service interval that started at second service interval boundary 714. The sequence numbers used during the second service interval (between the second service interval boundary 714 and the third service interval boundary 720) are modified in this discussion with a tick mark (e.g., 0', 1', 2', etc) for purposes of disambiguating the responsive data packets generated during the second service interval from the data packets generated before and after the second service interval for this discussion only. One of ordinary skill in the art will recognize that unmodified sequence numbers that comply with the USB Specification are used in actual implementations of the present disclosure.

Since the free buffer count at point 719 is 5, there is enough room for all 4 of the desired data packets, so the synthetic data request packet includes a buffer count of 4. At point 721, the USB device 108 transmits a number of data packets to the DFP device 106, which retransmits the number of data packets to the UFP device 104 for storage (see blocks 614-616 of FIG. 6). At point 722, the DFP device 106 decrements the free buffer count by the number of data packets, or 4 (see block 618 of FIG. 6), and the previous LPF tracker is updated based on the number of data packets (see block 620 of FIG. 6).

Meanwhile, at point 723, the host device 102 transmits another data request packet, and the UFP device 104 retransmits the data request packet to the DFP device 106. Since the UFP device 104 still has data packets responsive to the data request packet, the UFP device 104 transmits responsive data packets from its buffer to the host device 102 at point 724 (see block 510 in FIG. 5).

The DFP device 106 receives the data request packet at point 725. Using the buffer count in the data request packet and noting that the previous LPF tracker indicates that the LPF packet has still not yet been reached by the UFP device 104, the DFP device 106 increments the free buffer count at point 726 by the amount (2) indicated in the data request packet, and updates the previous LPF tracker (see blocks 604-608 in FIG. 6).

At point 727, the DFP device 106 generates and transmits a synthetic data request packet (see blocks 610-612 of FIG. 6). This time, since the free buffer count is 3, the synthetic data request packet includes a buffer count of 3 instead of the maximum desired buffer count of 4. At point 728, the USB device 108 transmits a number of data packets to the DFP device 106, which retransmits the number of data packets to the UFP device 104 for storage (see blocks 614-616 of FIG. 6). At point 729, the DFP device 106 decrements the free buffer count by the number of data packets, or 3 (see block 618 of FIG. 6), and updates the previous LPF tracker based on the number of data packets.

Because there is no free buffer space indicated by the free buffer count at point 729, the DFP device 106 may not immediately create a subsequent synthetic data request packet, even though a data packet with the LPF flag set has not been received from the USB device 108. Instead, the DFP device 106 may wait until a data request packet is received from the UFP device 104 that indicates there is now room in the buffer of the UFP device 104. Accordingly, at point 730, the host device 102 generates a data request packet, and the UFP device 104 retransmits the data request packet to the DFP device 106. As before, since the UFP device 104 is still storing responsive data packets, the UFP device 104 transmits responsive data packets to the host device 102 at point 731 (see block 510 in FIG. 5).

The DFP device 106 receives the data request packet at point 732. Using the buffer count in the data request packet and noting that the previous LPF tracker indicates that the packet with the LPF set still has not yet been reached by the UFP device 104, the DFP device 106 increments the free buffer count at point 733 by the amount (2) indicated in the data request packet, and updates the previous LPF tracker (see blocks 604-608 in FIG. 6).

At point 734, the DFP device 106 generates and transmits a synthetic data request packet (see blocks 610-612 of FIG. 6). Since the free buffer count at point 733 is 2, the synthetic data request packet includes a buffer count of 2 instead of the maximum desired buffer count of 4. At point 735, the USB device 108 transmits a number of data packets to the DFP device 106, which retransmits the number of data packets to the UFP device 104 for storage (see blocks 614-616 of FIG. 6). At point 736, the DFP device 106 decrements the free buffer count by the number of data packets, or 2 (see block 618 of FIG. 6), and updates the previous LPF tracker based on the number of data packets.

The sequence continues from the bottom of FIG. 7B to the top of FIG. 7C. Carried over from FIG. 7B, the free buffer count at the start of FIG. 7C is 0, as indicated at point 736.

Similar to the actions from point 730 to point 736 in FIG. 7B, at point 737, the host device 102 generates a data request packet, and at point 738, the UFP device 104 answers with responsive data packets from its buffer. The DFP device 106 receives the data request packet at point 739, and at point 740 it increments the free buffer count by the buffer count of the data request packet (since the previous LPF sequence number has not yet been reached). At point 741, the DFP device 106 generates a synthetic data request packet with a buffer count of 2, because the free buffer count at point 740 is 2.

At point 742, the USB device 108 transmits a number of data packets responsive to the synthetic data request packet to the DFP device 106, and the DFP device 106 transmits the number of data packets to the UFP device 104 for storage. At point 743, the DFP device 106 decrements the free buffer count by the number of data packets (2), and updates the previous LPF tracker. One will note that the actions from point 737 to point 743 of FIG. 7C are similar to the actions from point 730 to point 736 in FIG. 7B.

At point 744, the host device 102 generates and transmits a data request packet to the UFP device 104, and the UFP device 104 retransmits the data request packet to the DFP device 106. In response to the data request packet, at point 745 the UFP device 104 transmits a responsive data packet to the host device 102 from its buffer. Because the responsive data packet (sequence number 8) has the LPF flag set, the UFP device 104 does not transmit any more data packets in response to the data request packet of point 746, even though more data packets are present in its buffer, since the data packet with the LPF flag set will be the last data packet expected by the host device 102 for the current service interval.

At point 747, the DFP device 106 receives the data request packet from the UFP device 104. The DFP device 106 updates the previous LPF tracker based on the buffer count of the data request packet (see block 606 of FIG. 6), and the previous LPF tracker now indicates that the UFP device 104 transmitted a packet with the LPF flag set to the host device 102. For example, if the previous LPF tracker is implemented with a FIFO queue, a single entry may be removed from the FIFO queue that indicates the LPF flag is set, thus indicating both the number of data packets (one) that were transmitted by the UFP device 104 to the host device 102 and that no further data packets were sent.

Accordingly, at point 748, the DFP device 106 increments the free buffer count based on the data request packet and the previous LPF tracker (see block 608 of FIG. 6). This time, since the previous LPF tracker indicates that a single data packet was transmitted, the DFP device 106 does not simply increment the free buffer count based on the buffer count in the data request packet. Instead, the DFP device 106 uses the previous LPF tracker to determine how many data packets will be transmitted by the UFP device 104 before it stops due to reaching the data packet having the LPF flag set, and increments the free buffer count by the number of data packets it has determined that the UFP device 104 will actually be sending (in this case, 1).

At point 749, the DFP device 106 generates and transmits a synthetic data request packet based on the free buffer count (see blocks 610-612 of FIG. 6). In this case, the buffer count of the synthetic data request packet is 1, since the free buffer count at point 748 is 1. At point 750, the USB device 108 transmits a number of data packets responsive to the synthetic data request packet, and the DFP device 106 retransmits the number of data packets to the UFP device 104 for storage (see blocks 614-616 of FIG. 6). At point 751, the DFP device 106 decrements the free buffer count by the number of data packets, or 1, and updates the previous LPF tracker (see block 618-620 of FIG. 6).

Subsequently, a third service interval boundary 720 occurs. As with the sequence numbers in the second service interval, the sequence numbers used by the DFP device 106 after the third service interval boundary 720 are denoted with a double-tick (e.g., 0″, 1″), and the sequence numbers used by the host device 102 after the third service interval boundary 720 are denoted with a tick (e.g., 0', 1') for disambiguation in the present discussion only.

After the third service interval boundary 720, at point 746 the host device 102 transmits its next data request packet. At this point, the UFP device 104 had provided data packets associated with sequence numbers 0-8, and the DFP device 106 had transmitted additional data packets associated with sequence numbers 0'-11' to refill the buffer of the UFP device 104. Accordingly, the UFP device 104 currently stores data packets associated with sequence numbers 0'-11'. As such, at point 752, the UFP device 104 provides the next data packets from the sequence that are responsive to the data request packet from the host device 102.

The DFP device 106 receives the data request packet from the UFP device 104 at point 753, and increments the free buffer count accordingly at point 754. The remainder of the actions, such as the generation of the synthetic data request packet at point 755 and the transmission of a number of data packets in response by the USB device 108 at point 756 are similar to other points discussed above, and so are not described again here for the sake of brevity. One will recognize that the sequence will continue while the host device 102 and the USB device 108 continue to exchange information through the extension environment.

While illustrative embodiments have been illustrated and described, it will be appreciated that various changes can be made therein without departing from the spirit and scope of the invention.

What is claimed is:

1. A method of managing USB SuperSpeed communication between a host device and a USB device via a non-USB extension medium, wherein the non-USB extension medium introduces higher latency into the USB SuperSpeed communication than allowed by a USB Specification, the method comprising:
   receiving, by a downstream facing port device (DFP device), a data request packet from an upstream facing port device (UFP device) via the non-USB extension medium, wherein the data request packet is based on an isochronous IN USB packet including a sequence number and a buffer count received by the UFP device from the host device;
   determining, by the DFP device, a number of data packets to request from the USB device, wherein the number of data packets to request is based on a free buffer count, and wherein the free buffer count is tracked by the DFP device to represent an amount of buffer space available on the UFP device;
   generating, by the DFP device, a synthetic data request packet, wherein the synthetic data request packet is a synthetic isochronous IN USB packet that includes a buffer count, wherein the buffer count is based on the determined number of data packets to request from the USB device;
   receiving, by the DFP device, a set of data packets from the USB device responsive to the synthetic data request packet; and
   transmitting, by the DFP device, the set of data packets to the UFP device via the non-USB extension medium.

2. The method of claim 1, further comprising:
   decrementing, by the DFP device, the free buffer count by a number of data packets in the set of data packets received from the USB device.

3. The method of claim 2, wherein the number of data packets in the set of data packets received from the USB device is less than or equal to the buffer count.

4. The method of claim 1, further comprising:
   receiving, by the DFP device, a subsequent data request packet from the UFP device, wherein the subsequent data request packet is based on a subsequent isochronous IN USB packet received by the UFP device from the host device, and wherein the subsequent data request packet includes a second buffer count; and
   incrementing, by the DFP device, the free buffer count by the second buffer count.

5. The method of claim 1, wherein the set of data packets received from the USB device includes a data packet that indicates an end of a burst, and wherein the method further comprises:
   updating, by the DFP device, a previous last packet flag tracker (previous LPF tracker) based on the data packet that indicates the end of the burst.

6. The method of claim 5, wherein updating the previous LPF tracker based on the data packet that indicates the end of the burst includes adding an entry to a FIFO queue that indicates the data packet that indicates the end of the burst was received.

7. The method of claim 5, further comprising:
   receiving, by the DFP device, a subsequent data request packet from the UFP device, wherein the subsequent data request packet is based on a subsequent isochronous IN USB packet received by the UFP device from the host device;
   determining, by the DFP device based on the previous LPF tracker, that data packets transmitted by the UFP device in response to the subsequent data request packet include the data packet that indicates the end of the burst; and
   incrementing, by the DFP device, the free buffer count based on a number of data packets indicated by the previous LPF tracker to be transmitted until the data packet that indicates the end of the burst is reached.

8. The method of claim 5, wherein the data packet that indicates the end of the burst is a data packet having a last packet flag (LPF) set.

9. A downstream facing port device (DFP device), comprising:
   a USB physical layer interface configured to be communicatively coupled to a USB device;
   a remote interface configured to be communicatively coupled to a non-USB extension medium, wherein the non-USB extension medium introduces higher latency into USB SuperSpeed communication than allowed by a USB Specification;
   a memory storing a free buffer count; and
   logic that, in response to execution by the DFP device, causes the DFP device to perform actions comprising:
      receiving a data request packet from an upstream facing port device (UFP device) via the remote interface, wherein the data request packet is based on an isochronous IN USB packet including a sequence number and a buffer count received by the UFP device from a host device coupled to the UFP device;
      determining a number of data packets to request from the USB device, wherein the number of data packets to request is based on the free buffer count, and wherein the free buffer count is tracked by the DFP device to represent an amount of buffer space available on the UFP device;
      generating a synthetic data request packet, wherein the synthetic data request packet is a synthetic isochronous IN USB packet that includes a buffer count, wherein the buffer count is based on the determined number of data packets to request from the USB device;

receiving a set of data packets from the USB device via the USB physical layer interface responsive to the synthetic data request packet; and transmitting the set of data packets to the UFP device via the remote interface.

10. The DFP device of claim 9, wherein the actions further comprise:

decrementing the free buffer count by a number of data packets in the set of data packets received from the USB device.

11. The DFP device of claim 10, wherein the number of data packets in the set of data packets received from the USB device is less than or equal to the buffer count.

12. The DFP device of claim 9, wherein the actions further comprise:

receiving a subsequent data request packet from the UFP device, wherein the subsequent data request packet is based on a subsequent isochronous IN USB packet received by the UFP device from the host device, and wherein the subsequent data request packet includes a second buffer count; and incrementing the free buffer count by the second buffer count.

13. The DFP device of claim 9, wherein the set of data packets received from the USB device includes a data packet that indicates an end of a burst, and wherein the actions further comprise:

updating in the memory a previous last packet flag tracker (previous LPF tracker) based on the data packet that indicates the end of the burst by adding an entry to a FIFO queue stored in the memory that indicates the data packet that indicates the end of the burst was received.

14. The DFP device of claim 13, wherein the actions further comprise:

receiving a subsequent data request packet from the UFP device, wherein the subsequent data request packet is based on a subsequent isochronous IN USB packet received by the UFP device from the host device;

determining, based on the previous LPF tracker, that data packets transmitted by the UFP device in response to the subsequent data request packet include the data packet that indicates the end of the burst; and incrementing the free buffer count based on a number of data packets indicated by the previous LPF tracker to be transmitted until the data packet that indicates the end of the burst is reached.

15. A non-transitory computer-readable medium having computer-executable instructions stored thereon that, in response to execution by a downstream facing port device (DFP device), cause the DFP device to perform actions for managing USB SuperSpeed communication between a host device and a USB device via a non-USB extension medium, wherein the non-USB extension medium introduces higher latency into the USB SuperSpeed communication than allowed by a USB Specification, the actions comprising:

receiving, by the DFP device, a data request packet from an upstream facing port device (UFP device) via the non-USB extension medium, wherein the data request packet is based on an isochronous IN USB packet including a sequence number and a buffer count received by the UFP device from the host device;

determining, by the DFP device, a number of data packets to request from the USB device, wherein the number of data packets to request is based on a free buffer count, and wherein the free buffer count is tracked by the DFP device to represent an amount of buffer space available on the UFP device;

generating, by the DFP device, a synthetic data request packet, wherein the synthetic data request packet is a synthetic isochronous IN USB packet that includes a buffer count, wherein the buffer count is based on the determined number of data packets to request from the USB device;

receiving, by the DFP device, a set of data packets from the USB device responsive to the synthetic data request packet; and transmitting, by the DFP device, the set of data packets to the UFP device via the non-USB extension medium.

16. The computer-readable medium of claim 15, wherein the actions further comprise:

decrementing, by the DFP device, the free buffer count by a number of data packets in the set of data packets received from the USB device.

17. The computer-readable medium of claim 16, wherein the number of data packets in the set of data packets received from the USB device is less than or equal to the buffer count.

18. The computer-readable medium of claim 15, wherein the actions further comprise:

receiving, by the DFP device, a subsequent data request packet from the UFP device, wherein the subsequent data request packet is based on a subsequent isochronous IN USB packet received by the UFP device from the host device, and wherein the subsequent data request packet includes a second buffer count; and incrementing, by the DFP device, the free buffer count by the second buffer count.

19. The computer-readable medium of claim 15, wherein the set of data packets received from the USB device includes a data packet that indicates an end of a burst, and wherein the actions further comprise:

updating, by the DFP device, a previous last packet flag tracker (previous LPF tracker) based on the data packet that indicates the end of the burst by adding an entry to a FIFO queue that indicates the data packet that indicates the end of the burst was received.

20. The computer-readable medium of claim 19, wherein the actions further comprise:

receiving, by the DFP device, a subsequent data request packet from the UFP device, wherein the subsequent data request packet is based on a subsequent isochronous IN USB packet received by the UFP device from the host device;

determining, by the DFP device based on the previous LPF tracker, that data packets transmitted by the UFP device in response to the subsequent data request packet include the data packet that indicates the end of the burst; and incrementing, by the DFP device, the free buffer count based on a number of data packets indicated by the previous LPF tracker to be transmitted until the data packet that indicates the end of the burst is reached.

* * * * *